United States Patent [19]

Ruiz

[11] Patent Number: 4,584,467
[45] Date of Patent: Apr. 22, 1986

[54] FORCED HOT AIR HEATING CABINET FOR SELF-LEVELING PLATE DISPENSERS AND THE LIKE

[75] Inventor: Guillermo A. Ruiz, Miami, Fla.

[73] Assignee: Shelley Manufacturing Division of Alco Food Service Equipment Company, Miami, Fla.

[21] Appl. No.: 695,615

[22] Filed: Jan. 28, 1985

[51] Int. Cl.[4] .......................... H05B 1/02; A47F 1/06
[52] U.S. Cl. .................................... 219/400; 219/521; 219/386; 211/59.3
[58] Field of Search ............... 219/400, 385, 386, 521; 312/71, 306, 312; 221/279, 14; 211/59.2, 59.3; 220/93

[56] References Cited

U.S. PATENT DOCUMENTS

| | | | |
|---|---|---|---|
| 3,033,633 | 5/1962 | Halloway | 219/400 |
| 3,493,725 | 2/1970 | MacKay | 219/385 |
| 3,536,891 | 10/1970 | Lee | 219/385 |
| 3,717,397 | 2/1973 | Cummings | 312/71 |
| 4,089,322 | 5/1978 | Guibert | 219/400 |

Primary Examiner—C. L. Albritton
Assistant Examiner—Teresa J. Walberg
Attorney, Agent, or Firm—Ernest H. Schmidt

[57] ABSTRACT

A rollably portable insulating cabinet having top openings for the replaceable installation of self-leveling dispensers for stacked plates and the like has removeably assembled thereto, through a bottom opening, an air heater and blower assemblage of unitary structure and having longitudinally-extending heating elements so arranged and located with respect to vertically extending slot openings in the plate dispensers as to efficiently circulate blower-forced air heated by the heating elements through the plate dispenser slots for uniformly heating stacked plates within the dispensers.

9 Claims, 6 Drawing Figures

FORCED HOT AIR HEATING CABINET FOR SELF-LEVELING PLATE DISPENSERS AND THE LIKE

BACKGROUND OF THE INVENTION

This invention relates to heating cabinets for plate dispensers of the type used in cafeterias or restaurants, and is directed particularly to improvements therein with respect to the forced hot air heating of the plates or other products to be dispensed. The heating cabinet is designed for uniformly heating stacked plates or the like flat objects in circular self-leveling plate or dish dispensers illustrated by way of example in patent application Ser. No. 06/506,528 of Guillermo A. Ruiz, filed June 22, 1983, issued as U.S. Pat. No. 4,529,093 dated July 16, 1985. Such self-leveling plate dispensers are adapted for vertical installation through top openings in novel and improved forced hot air heating cabinets of the type herein described, and have vertical slots through which forced hot air flows for uniformly circulating through and heating the stacked items, as is hereinafter more particularly described.

SUMMARY OF THE INVENTION

It is the principal object of the present invention to provide a forced hot air heating cabinet for self-leveling plate dispensers of the type hereinabove described that utilizes longitudinally-extending electrical heating elements so arranged and located with respect to vertically extending slot openings in the plate dispensers as to efficiently and rapidly heat the stacked plates or other items to be dispensed to within a pre-determined temperature range, as desired, without overheating.

Another object of the invention is to provide a hot air heating cabinet of the character described wherein the air heater and blower assemblage is unitary in structure for convenient assemblage to the enclosing cabinet by insertion through an opening in the bottom of the cabinet, thereby simplifying installation and repair whenever necessary.

Yet another object is to provide an air heater and blower assemblage having a plurality of vertically-extending forced air slots, arcuately spaced from one another to direct heating air along various positions within the surrounding cabinet to provide for heating a plurality of correspondingly positioned self-leveling plate dispensers in the cabinet.

Another object is to provide an air heater and blower assemblage of the above nature wherein the blower motor is so located and arranged with respect to the forced hot air circulation flow path as to be maintained at a safe, lower operating temperature.

Yet another object of the invention is to provide a forced hot air heating cabinet for self-leveling plate dispensers and the like which is portable on rollers to provide for the convenient dispensing of heated plates and the like wherever needed.

Other objects, features and advantages of the invention will be apparent from the following description when read with reference to the accompanying drawings.

BRIEF DESCRIPTION OF THE DRAWINGS

In the drawings, wherein like reference numerals denote corresponding parts in each of the several views.

Figures 1, 2, 3:
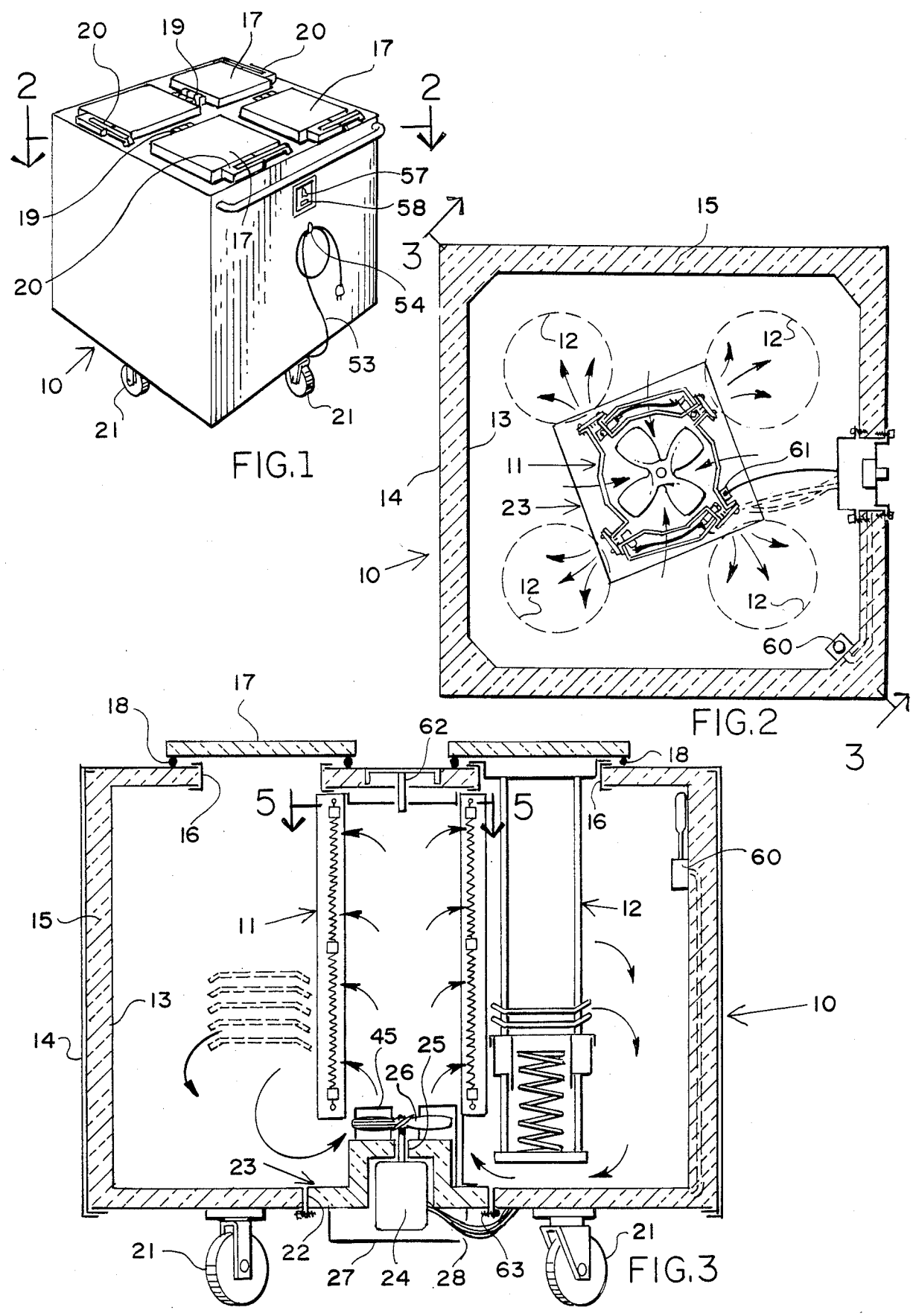
FIG. 1 is an oblique view of a forced hot air heating cabinet embodying the invention.
FIG. 2 is a horizontal cross-sectional view, taken along the line 2—2 of FIG. 1 in the direction of the arrows.
FIG. 3 is a vertical cross-sectional view, taken along the line 3—3 of FIG. 2 in the direction of the arrows.

Referring now in detail to the drawings, reference numeral 10 in FIG. 1 designates, generally, an insulated cabinet embodying the invention, said cabinet being square in shape to accommodate four chambers, one in each corner, for the removeable reception of self-leveling dispensers which support plates or the like to be heated before dispensing use. As illustrated generally in FIGS. 2 and 3, centrally disposed within the cabinet 10 is a forced air electrical heater unit 11, which serves to heat plates or other articles supported in self-leveling dispensers 12 (only one illustrated by way of example in FIG. 3).

As is best illustrated in FIGS. 1, 2 and 3, the insulated cabinet 10 comprises a double wall enclosure having spaced inner and outer walls 13, 14 containing thereinbetween thermal insulating material 15, preferably high temperature fiberglas matting. The inner and outer walls 13 and 14 will preferably be fabricated of galvanized sheet metal and/or stainless steel welded or bolted together to provide for structural rigidity. The top of the cabinet 10 has four symmetrically-spaced, round openings 16 for insertion of the plate dispensers 12 or the like to be heated. Insulating lids 17 close the round openings 16 at the top of the cabinet 10 when the cabinet is not being used for the self-leveling dispensing of heated plates or other articles. The insulating lids are individually insulated and have air-sealing gaskets 18 (see FIG. 3). The lids 17 are also hinged at the rear ends, as illustrated at 19, and provided with latches 20 at the front for securing in tight covering relation over their respective dispenser openings when not being used for dispensing. Casters 21 are provided at the bottom adjacent to each side of the cabinet in diamond shape for portability (only two casters illustrated in FIGS. 1 and 3). A square through opening 22 centrally located in the bottom of insulated cabinet 10 is provided for assembly of a forced air electrical heating unit 11, as is hereinafter described.

Figure 4:
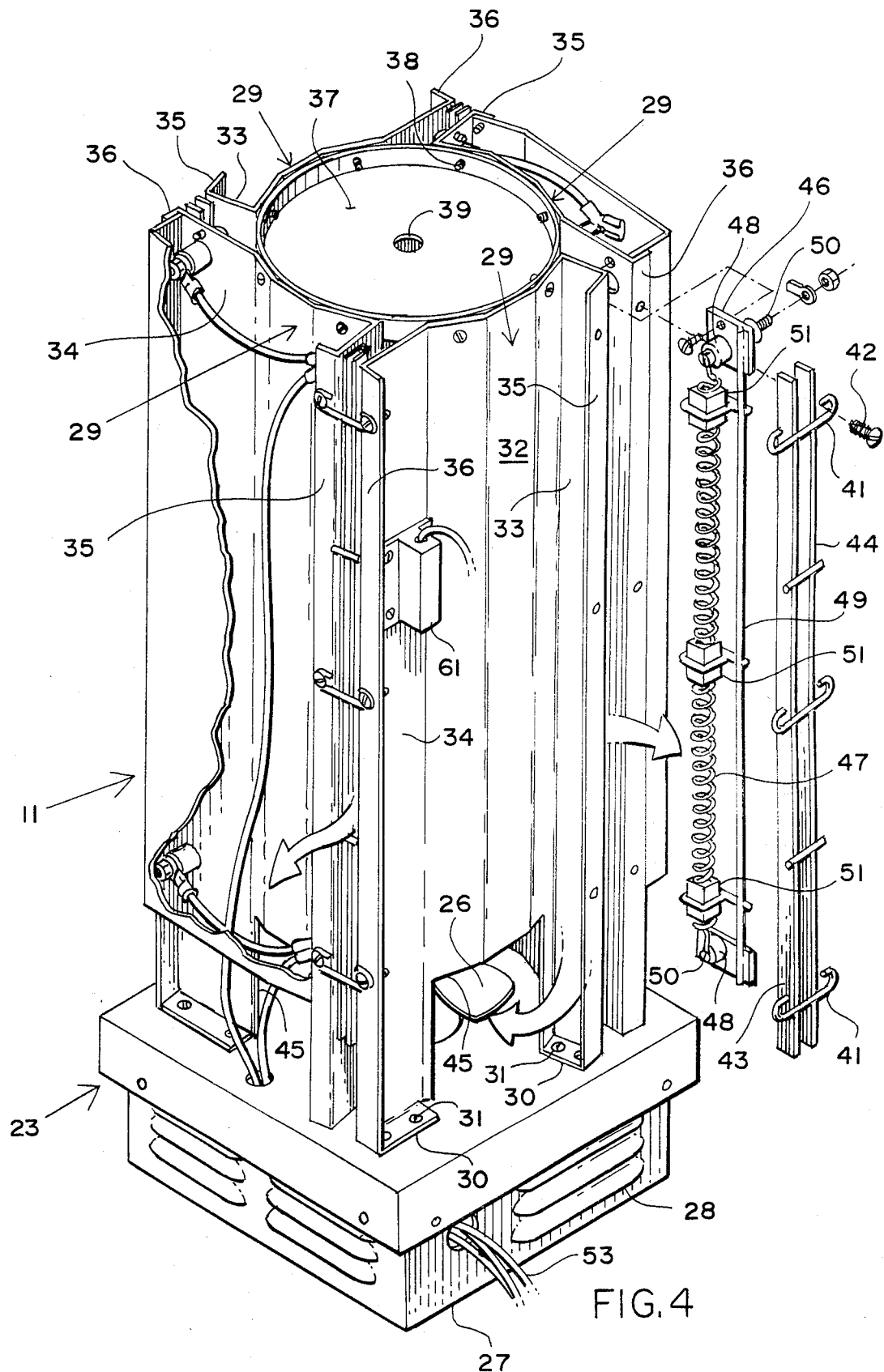
FIG. 4 is an oblique view of the forced air heating unit, shown separately on an enlarged scale, and partially cut away and "exploded" to reveal details of internal construction.
Figure 5:
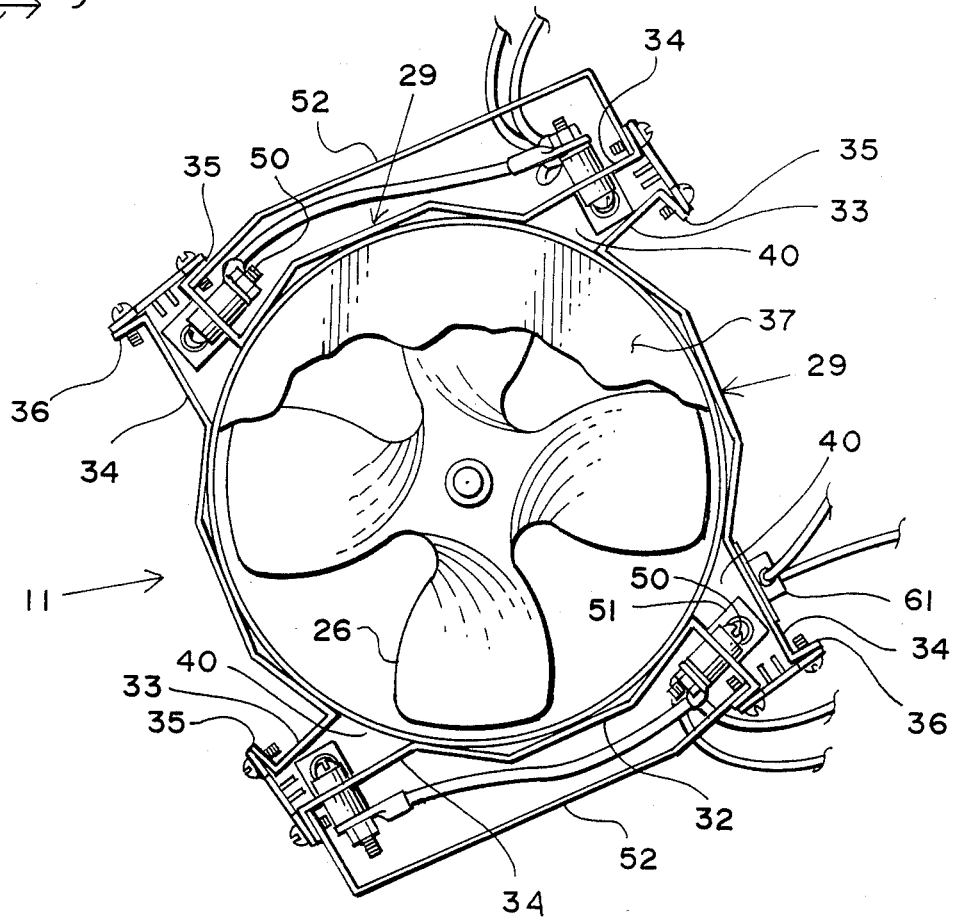
FIG. 5 is a horizontal cross-sectional view, on an enlarged scale, taken along the line 5—5 of FIG. 3 in the direction of the arrows.

Referring now to FIG. 4 of the drawings, the forced air electrical heating unit 11 comprises a sheet metal base 23, double walled and insulated as best illustrated in FIG. 3, within which is mounted an electrical blower motor 24, the drive shaft of which extends through a small opening 25 and carries a blower fan 26 (see FIG. 3). A square sheet metal housing 27 bolted to the underside of the heater unit base 23 encloses the blower motor 24 and has louvered openings 28 for air cooling of the motor. As best illustrated in FIG. 3, the electrical heating unit 11 further comprises bent sheet metal sidewall members 29 having feet 30 secured as by sheet metal screws 31 against the top of the base 23 and extending vertically upward therefrom. The sidewall members 29 are each bent to provide a generally arcuate central portion 32, an acutely bent portion 33 at one side, and an obtusely bent portion 34 at the other side, terminating in marginal, inwardly-bent portions 35 and 36, respectively. As best illustrated in FIG. 5, the four sidewall members 29 of the heater unit 11 are so arranged and fixed with respect to their supporting base 23 that their arcuate portions 32 define a circle. As a retaining means and as means for locating the heater unit assembly to its cabinet 10, a shallow, cylindrical sheet metal cap 37 is secured to the upper ends of the sidewall members 29 by a plurality of sheet metal screws 38. A central guide hole 39 is provided in the center of the cap 37 to facilitate assembly of the heater unit 11 to the cabinet, as in hereinbelow more particularly described.

The adjacent acutely-bent and obtusely-bent portions 33 and 34 of adjacent ones of the sidewall members 29 define four equidistantly and peripherally spaced, sidewardly-outwardly-extending openings 40 (See FIG. 5.), of decreasing cross-sectional area from the inside to the outside. Bent rod spacers 41 provide loops at each end through which sheet metal screws 42 extend for securing the marginally outwardly-bent portions 35, 36 in relatively fixed position at three places along their lengths. Welded or otherwise secured against the insides of the spacers 41 are a pair of spaced, parallel bars 43, 44 for further restricting and directing laminar forced hot air flow, as in hereinbelow more particularly described. Lower end sections of the arcuate portions 32 of an opposed pair of sidewall members 29 are cut away to provide openings 45 for the return of circulating hot air, as is hereinbelow more particularly described.

As best illustrated in FIGS. 4 and 5, an electrical heater coil assembly is secured within the throat of each of the openings 40 for electrical heating of the circulating air being forced therethrough. To this end, an elongated coil of nickel-chromium resistance heater wire 47 is supported near each end and at the middle in ceramic electrical insulating members 48, which, in turn, are secured along a vertical support rod 49 fixed with respect to the inside of the obtusely bent portions 34 of their respective opposed sidewall members 29. The terminal ends of the resistance heater wire coils 47 are secured to the inner ends of bolts 50 extending through openings in the ends of vertical bar support plates 46, which bolts also extend through their respective obtusely bent portions 34 of their associated sidewall members 29. Ceramic insulators 48 and 51 electrically insulate the heater wires from their vertical support mechanism and the metallic structure of the electrical heating unit 11.

Insulated electrical conductors 70, 71, 72 and 73 connect the resistance heater wire coils 47 in parallel for energization, as is more particularly described hereinbelow with reference to the electrical schematic drawing in FIG. 6. As best illustrated in FIGS. 4 and 5, sheet metal cover plates 52 enclose the outsides of the diametrically-opposed sidewall members 29 supporting the electrical heater coils 47.

Figure 6:
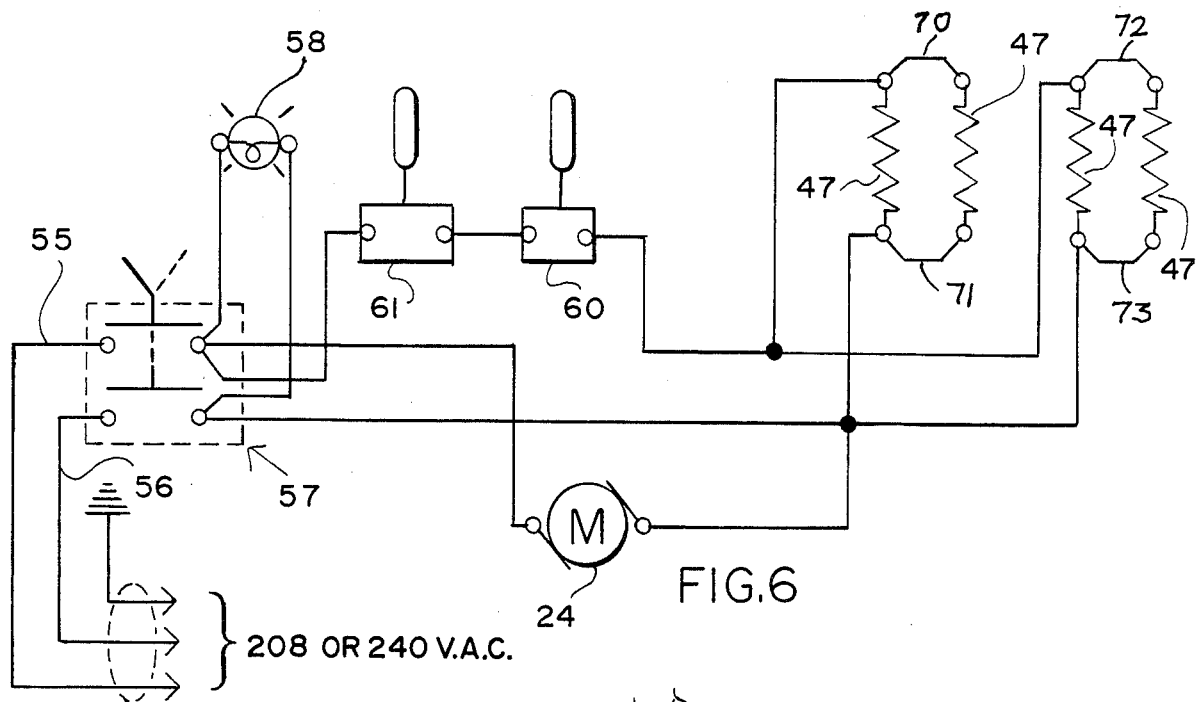
FIG. 6 is an electrical schematic diagram of the electric heater and blower motor energizing circuitry.

Referring now to the electrical schematic diagram of FIG. 6, reference numeral 53 indicates, schematically, the electrical line cord which serves to energize the electrical heating elements and the forced air blower motor 24 of the cabinet 10. As illustrated in FIGS. 1 and 4, the electrical line cord 53 extends through an opening in the sheet metal housing 27 of the heater unit 11 and, when not in use, can be supported on a hook 54 provide at one side of the insulated cabinet 10. With further reference to FIG. 6, the electrical feed conductors 55, 56 of the line cord 53 connect, through double-pole, double-throw electrical switch 57 to pilot light 58 and blower motor 24, thereby controlling both. The blower motor 24 and the pilot light 58 will thus become energized whenever the switch 57 is switched to the on position. As illustrated in FIG. 1, the pilot light 58 and the switch 57 are mounted in the side of the cabinet 10 at the front, just below a push bar 59. All four of the electrical heating coils 47 are connected in parallel, and in series with lower temperature limit switch 60 and upper temperature limit switch 61. As illustrated in FIG. 4, the upper temperature limit switch 61 is attached to the outside of one of the obtuselybent portions 34 to sense temperature of the hot air being forced through the associated throat opening 40. Maximum heated air temperature is thus sensed. Lower temperature limit switch 60, as illustrated in FIG. 2, is located within the corner of the cabinet 10 to sense low temperature air within the cabinet.

With reference to FIG. 3, the electrical heater unit 11 illustrated in FIG. 4 is assembled within the insulated cabinet 10 by inserting it upwardly through the central rectangular opening 22 therein. A central locating pin 62 extending downwardly of the inside of the cabinet 10 (See FIG. 3), serves as a locating and guide pin for the upper end of the heater unit 11 when fitted in place. Thus, as illustrated in FIG. 3, the lower end portion of the locating pin 62 fits into the central guide hole in the cap 37 at the upper end of the electrical heater unit 11. After being fitted in place, the base 23 of the electrical heater unit 11 is secured within the cabinet opening 22, such as by bolts 63.

In use, the self-leveling plate or dish dispensers 12 are inserted through the cabinet openings 16, to be supported at the top by abutment with marginal peripheral portions thereof at the top of the cabinet (See FIG. 3.). Such plate or dish dispensers will be circularly oriented to present sidewall openings, whether longitudinally-extending slots or a plurality of circular openings, directly opposite the vertically-extending throat openings 40 of the heating unit 11, so as to receive the laminar flow of forced hot air within the length of the dish dispenser for uniformly heating the stacked plates therein to be dispensed. Thus, as illustrated in FIGS. 2 and 3, the forced hot air flows over and between the stacked plates to recirculate through the openings 45 at the bottom of sidewall members 29, as is further illustrated by the air flow arrows in FIG. 4. As described above, the temperature to which the plates or other articles to be dispensed are heated is kept within upper and lower limits, as desired, by lower and upper temperature limit switches 60 and 61. The insulating lids 17 maintain the heated plates at proper temperature for dispensing at the desired location. Upon use, the corresponding latch 20 will be released, allowing the heated plates or other articles in the dispenser to project outwardly of the openings under spring action for one at a time removal.

While the forced hot air heating cabinet is illustrated in square configuration for accommodating four self-leveling plate dispensers, one near each corner, the invention is adapted as well to two or three plate dispenser stack use simply by eliminating the excess one or two cabinet dispenser openings not needed, and reducing cabinet size accordingly, while at the same time blocking and deenergizing a like number of hot air openings 40 in the heater unit 11 not required.

While I have illustrated and described herein only one form in which my invention can conveniently be embodied in practice, it is to be understood that this form is presented by way of example only, and not in a limiting sense. The invention, in brief, comprises all the embodiment and modifications coming within the scope and spirit of the following claims.

What I claim as new and desire to secure by Letters Patent is:

1. In a forced hot air heating cabinet having an interior chamber for the reception of self-leveling plate dispensers of the type having a vertically-extending, tank having a top and a bottom, and being open at the top for receiving stacked plates and dishes to be dispensed and including mechanism resiliently constraining the stacked plates and dishes therein in an upward, outwardly-projecting direction from underneath for dispensing from the top of the tank, the open-top having vertically arranged through openings permitting sideward flow of air therethrough, the combination comprising; an insulating cabinet having a plurality of top openings for replaceable vertical installation of a like plurality of said self-leveling plate dispensers, means in said cabinet for force-blowing heated air in vertically extending laminar flow through the openings in said plate dispenser tanks installed in said cabinet openings, said removable lids covering said cabinet openings and abuttingly constraining said stacked plates to be dispensed in an inward direction for heating and maintaining heated said stacked plates to be dispensed.

2. A forced hot air heating cabinet as defined in claim 1 wherein said heated air force blowing means comprises an air heater and blower assemblage of unitary structure and having longitudinally-extending heating elements so arranged and located with respect to said slots or openings in said dispenser tanks as to circulate therethrough blower-forced air heated by the heating elements for uniformly heating stacked plates within the dispensers.

3. A forced hot air heating cabinet as defined in claim 2 wherein said air heater and blower assemblage comprises a plurality of arcuately-spaced, vertically-extending throat openings, an elongated electrical heating element disposed within each of said throat openings, and a blower fan for the forced air circulation of cabinet air through said throat openings for heating by said electrical heating elements prior to discharge into said dispenser tanks for heating stacked plates therein.

4. A forced hot air heating cabinet as defined in claim 3 including a bottom opening in said cabinet, said air heater and blower assemblage being removeably assembled to said cabinet through said bottom opening.

5. A forced hot air heating cabinet as defined in claim 4 wherein said blower fan is arranged at a lower end of said air heater and blower assemblage, said blower fan having an electrical drive motor located beneath said air heater and blower assemblage and being thermally insulated with respect thereto and to the interior chamber of said cabinet.

6. A forced hot air heating cabinet as defined in claim 5, including an electrical energizing circuit for said electrical drive motor and said electrical heating elements, said energizing circuit comprising series-connected upper and lower temperature limit switches within said cabinet for maintaining heating temperatures within a predetermined range.

7. A forced hot air heating cabinet as defined in claim 6 wherein said air heater and blower assemblage is substantially cylindrical in configuration, said vertically extending throat openings being four in number, 90 degrees arcuately spaced one from the other, said cabinet being square in shape, said bottom opening therein being centrally located for the central disposition therein of said air heater and blower assemblage, said cabinet top openings being located symmetrically near the corners of said cabinet.

8. A forced hot air heating cabinet as defined in claim 7 wherein the underside of said cabinet is equipped with caster rollers, one side of said cabinet being equipped with a push bar to provide for manually rolling said cabinet from place to place.

9. A forced hot air heating cabinet as defined in claim 8 wherein said cabinet and said lid comprise interior and exterior wall portions having, respectively, insulation thereinbetween.

* * * * *